US009460395B2

(12) United States Patent
Baker

(10) Patent No.: US 9,460,395 B2
(45) Date of Patent: Oct. 4, 2016

(54) SYSTEM AND METHOD FOR DEPLOYING PREDICTIVE MODELS

(71) Applicant: Intuit Inc., Mountain View, CA (US)

(72) Inventor: Tristan C. Baker, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 14/569,895

(22) Filed: Dec. 15, 2014

(65) Prior Publication Data

US 2016/0171379 A1    Jun. 16, 2016

(51) Int. Cl.
*G06N 5/04* (2006.01)
*H04L 29/06* (2006.01)

(52) U.S. Cl.
CPC ............... *G06N 5/045* (2013.01); *H04L 63/08* (2013.01); *H04L 63/102* (2013.01)

(58) Field of Classification Search
CPC ........ G06N 5/045; G06N 3/049; G06N 3/02; G06N 99/005; H04L 63/08; H04L 63/102; G05B 13/027; G05B 13/048
USPC ......... 706/11, 15, 21, 46; 705/30–31, 34–35
See application file for complete search history.

(56) References Cited

U.S. PATENT DOCUMENTS

| | | | | |
|---|---|---|---|---|
| 7,480,640 B1* | 1/2009 | Elad | ....................... | G06Q 10/10 706/14 |
| 7,499,897 B2* | 3/2009 | Pinto | ..................... | G06Q 30/02 706/11 |
| 8,229,864 B1* | 7/2012 | Lin | ....................... | G06F 17/246 706/11 |
| 8,886,654 B2 | 11/2014 | Agrawal et al. | | |
| 2010/0115113 A1* | 5/2010 | Short | ...................... | H04L 63/08 709/228 |
| 2011/0225157 A1 | 9/2011 | Rajaram et al. | | |
| 2014/0172560 A1* | 6/2014 | Satyavolu | ............ | H04M 15/805 705/14.53 |
| 2015/0142713 A1* | 5/2015 | Gopinathan | ............ | G06Q 40/00 706/14 |
| 2015/0347907 A1* | 12/2015 | Mathew | ................... | G06N 5/04 706/12 |

OTHER PUBLICATIONS

'Google Prediction API' [online], [retrieved on Apr. 28, 2015]. Retrieved from the Internet <URL: https://cloud.google.com/prediction/>.

* cited by examiner

*Primary Examiner* — Stanley K Hill
*Assistant Examiner* — Dave Misir
(74) *Attorney, Agent, or Firm* — Hawley Troxell Ennis & Hawley LLP; Philip McKay

(57) ABSTRACT

A system and method for deploying predictive models is presented which personalizes application program functionality and user interface presentation to the consumer user. That personalization takes place within a decision engine that decouples decision models from application processes so that rapid deployment may take place. When a consumer user specific decision is required, the application program interacts with the decision model to trigger a consumer-user appropriate decision tailored to characteristics of the consumer user. New models are introduced into a decision process without requiring any application program change.

33 Claims, 3 Drawing Sheets

SYSTEM AND METHOD FOR DEPLOYING PREDICTIVE MODELS

BACKGROUND

Application programs come in many varieties, from the simple to the complex. For example, some application programs are standalone and are configured to run as a single discrete executable entity. Often, these standalone application programs are locally installed and executed on independent computing systems operated by or otherwise under the control of a single user, or perhaps by multiple users of the same household.

For example, desktop computing systems based financial management programs exist as application programs that execute on a standalone computing system such as a desktop computing system, interacting directly with the user, typically accessing a network for a very narrow range of reasons, such as to receive updates to the application program.

Other application programs are configured as network accessible application programs which have remote users logging in from other computing systems, and also which may use network-accessible services provided by other computing systems, such as databases and other services known to those of ordinary skill.

In each of the situations above, the standalone computing system environment and the network accessible computing system environment, the application program and any data the application program requires in order to properly perform one or more application program functions are both tightly coupled. Thus, when a designer of a given implementation of an application program becomes aware that a change needs to be made, for example, to the data that an application program uses, such as when a portion of the application program should consider additional details relating to its consumer users in order to provide an optimized user interface to the consumer user, it is often necessary to make significant changes to related application program functionality, in order to accommodate the different data needs.

In one example, financial management and other application programs occasionally make divisions based on consumer user input received through application program provided user interfaces. However, due to the application program having the decision-making functionality built into one or more application program modules, making change to the considered data is quite burdensome and typically requires that changes only be make when the application program is expected to undergo a new release from a first older version to a second newer version.

When the application program id large-scale and serves thousands of users at any given moment, replacing a first version of an application program with a later second version may affect hundreds or thousands of parties who are using the application program.

Further, software companies face decisions every day regarding appropriately coupling/decoupling the myriad systems upon which the business relies. As a business and its customers evolve, organizations often restructure themselves into groups of people with specializations in very particular areas of a problem space. Company organizations often have teams of people specializing in marketing, analytics, experience design, tax law, and other specializations.

In addition to being appropriately versed in their problem space, a successful team needs to be empowered to implement a potential solution quickly, receive feedback on that solution and immediately turn around another improved solution. Such teams are often burdened by waiting for major release dates, for example, because waiting for a given release date to occur and new data resulting from the given release to be collected and new models developed take a ling time, largely due to the tightly coupled nature of application program development and release cycles.

In terms of a decision modeling team, whose responsibility is to ensure that accurate decision models are enabled in a given application program so that when a decision is needed which will result in a change to application program functionality, the correct data is considered to arrive at a correct result.

However, a critical component that is missing, due to the tightly coupled nature of the application program to the decision functionality, is the ability for the decision model team to quickly publish their solution and take measurements on the results.

Because the data science teams work with the same application program that manages and controls all aspects of functionality, they must pursue application program development that tightly couples the solution to the body of the application program. Even in the best cases, the teams operate with significantly reduced agility due to needing to share a single deployment cycle. In the worst cases, this kind of integration is not even possible because the solution is particularly greedy in space (memory) and/or time (processing resources), that the consuming application's hardware is not able to accommodate it without a significant retooling of the deployment architecture.

SUMMARY

A system and method for deploying predictive models includes process operations which receive electronic data from multiple sources, the electronic data including, in one embodiment, financial data such as financial transactions, invoices, receipts, income, payments, and other financial transactions. The financial data further includes characteristic data about a consumer user associated with the financial transaction data. An application program requiring a consumer user specific decision interacts with a decision engine employing an appropriate decision model for the particular desired consumer user decision providing consumer data and a model identifier to the decision engine which uses the provided information to select a decision model. Following processing the decision model with characteristic and other data associated with the consumer user, a decision is rendered by the decision engine and provided back to the originating application program which then implements the decision and provides a customized experience to the consumer as a result.

By only loosely coupling the components responsible for orchestrating the data and services required to deliver a specific consumer experience and the components responsible for providing personalized and optimized experience decisions, less processor time is used in deploying updates to decision models and application programs, and a high degree of flexibility is achieved together with rapid and safe deployment, efficient and decoupled execution and timely measurement and analysis. Further, decoupling the decision engine and the application program allows for scalable solutions serving thousands of users simultaneously using a wide variety of application programs. Decision engines operating on decision models are, in one embodiment, designed to accommodate requests from many different application programs. Further, when a decision engine is deployed in a dynamic environment capable of adjusting computing processor, memory or network resources, maximum efficiency is obtained.

In one embodiment, a system for deploying predictive models is performed by one or more computing processors of one or more computing resources such as one or more computing system, one or more virtual computing resources, or a combination.

In one embodiment, a system for deploying predictive models includes an application program computing resource executing an application program, the application program computing resource being coupled to a network.

In one embodiment, a system for deploying predictive models further includes a decision engine operatively coupled to the application program, and a data aggregation service operatively coupled to the decision engine.

In one embodiment, one or more computing processors executes computing processor executable instructions to perform process operations including, for example, receiving, at an application program computing system, data identifying an authorized consumer user who is currently using the application program.

In one embodiment, the process further includes determining, by the application program and using data associated with the authorized consumer user, characteristics of a next action to be performed by the application program, the next action being a configurable action and involving at least one interaction with the authorized consumer user.

In one embodiment, the process further includes determining, by the decision engine using resources of the data aggregation service and from a plurality of next action configurations, an active configuration appropriate for the authorized consumer user.

In one embodiment, the process further includes implementing, by the application program, the active configuration.

In one embodiment, the application program is any of, or is a combination of, a financial application program, a tax preparation application program, a bookkeeping application program, a payment application program, a billing application program, an application program for generating profit and loss reports, an application program for generating invoices, an application program for generating payroll, an application program for providing bank statements or on-line banking feeds, an application program for generating any financial reports, an accounting application program, a point of sale application program, and an application program for tracking and processing inventory.

In one embodiment, the process further includes receiving, at the application program computing system, login information from a consumer user and then validating the login information as being of an authorized consumer user. Once the login information is validated, the process proceeds with correlating the validated login information with a consumer user identifier. At times, there is a next action to be performed by the application program, where the next action is a configurable action involving at least one interaction with the authorized consumer user.

In one embodiment, when the application program wishes to determine a consumer user specific configuration, it issues a decision request to a decision engine having a decision model corresponding to the desired decision. The decision request includes, in one embodiment, a consumer user identifier identifying a consumer user associated with the desired decision. The decision request further includes, in one embodiment, a decision model identifier identifying a decision model associated with the desired decision.

In one embodiment, the process includes determining, using the decision model identifier, a decision model configured to make the decision, and to further determine, by the decision engine, one or more data elements required by the decision model. The decision model further determines, using the data aggregation service engine, data values associated with the one or more data elements, the determined data values being data values associated with the authorized consumer user. The process further applies the determined data values to the decision model configured to determine an active configuration associated with the next action and then associates the determined active configuration with the next action.

In one embodiment, determining data values associated with the one or more data elements includes accessing, using the consumer user identifier, a data aggregation service of consumer data, the data aggregation service of consumer data including data values of at least two different consumer users and then retrieving one or more data values of the authenticated consumer user from the data aggregation service, each of the retrieved data values corresponding with a respective one of the one or more data elements.

In one embodiment, determining, using one or more of the submitted data values, a configuration associated with the next action includes accessing the data aggregation service to determine a population group that has population data values that match the determined data values associated with the authorized consumer user.

In one embodiment, following the determination of a population group that has population data values that match the determined authorized consumer user, the process determines, by the decision engine, a configuration associated with the population group that has been personalized to the determined population group and then implements the determined configuration.

In one embodiment, the determined configuration includes one or more configuration parameters selected from the group of configuration parameters such as one or more of a display parameter, a data ordering parameter, a priority parameter indicating that a particular aspect of the next action is important to the determined population group, an inclusion parameter indicating that a particular optional aspect of the next action is important to the determined population group, an exclusion parameter indicating that it is important that a particular optional aspect of the next action is to be given little or no weight in the performance of the next action.

In one embodiment, the received data identifying an authorized consumer user includes one or more of a network address associated with a computing system under the control of the consumer user, a username used in a login sequence associated with the application program, and a username used in a login sequence of a computing system under the control of the consumer user.

In one embodiment, the decision engine employs one or more replaceable decision models.

In one embodiment, the application program is configured to specify to a decision engine which decision model is appropriate for a given next action, and the decision model uses the designation of a particular model to determine particular consumer user data requirements as inputs to the particular model.

By decoupling and improving consumer-specific decision making, implementation of embodiments of the present disclosure allows for significant improvement to the field of computing system and application deployment.

Figure 1:
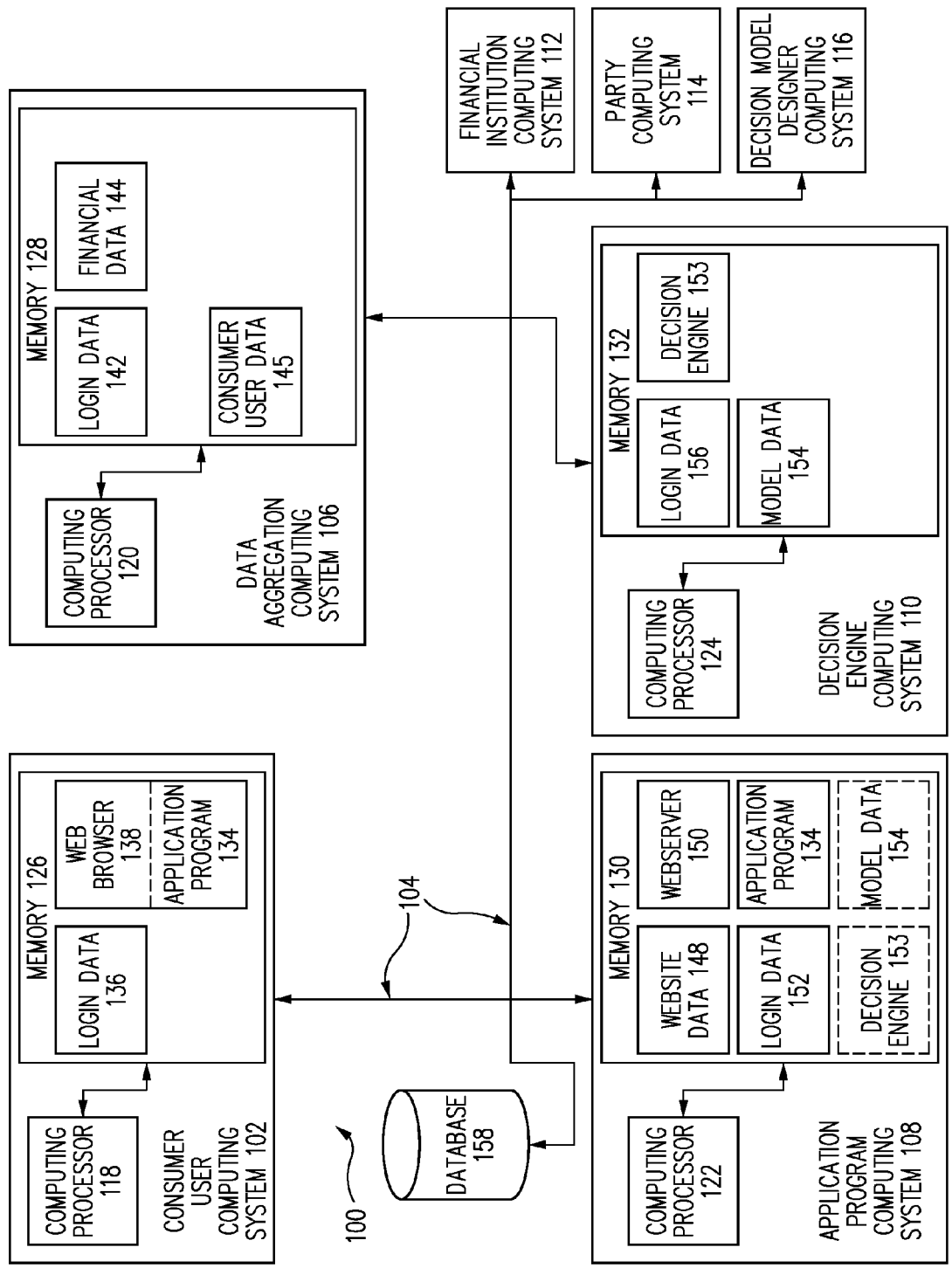
FIG. 1 is a functional block diagram showing the interaction of various elements for implementing one embodiment of a system and method for deploying predictive models.

Common reference numerals are used throughout the figures and the detailed description to indicate like elements. One skilled in the art will readily recognize that the figures are examples and that other architectures, modes of operation, orders of operation and elements/functions can be provided and implemented without departing from the characteristics and features of the invention, as set forth in the claims. Unless specifically stated, operations discussed herein may be implemented in any order or combined, as determined by the designer of a system implementing the subject matter described herein.

DETAILED DESCRIPTION

A system and method for deploying predictive models includes process operations executed using one or more computing processors, and serving one, two, hundreds, or thousands of consumer users simultaneously, using one or more application programs.

A system and method for deploying predictive models includes process operations which receive electronic data from multiple sources, the electronic data including, in one embodiment, financial data such as financial transactions, invoices, receipts, income, payments, and other financial transactions. The financial data further includes characteristic data about a consumer user associated with the financial transaction data. An application program requiring a consumer user specific decision interacts with a decision engine employing an appropriate decision model for the particular desired consumer user decision providing consumer data and a model identifier to the decision engine which uses the provided information to select a decision model. Following execution of or processing of the decision model with characteristic and other data associated with the consumer user, a customized decision tailored to the consumer user is rendered by the decision engine and provided to the originating application program.

By decoupling the components responsible for orchestrating the data and services required to deliver a specific consumer experience and the components responsible for providing personalized and optimized experience decisions, less processor time is used in deploying updates to decision models and application programs, and a high degree of flexibility is achieved together with rapid and safe deployment, efficient and decoupled execution and timely measurement and analysis. Further, decoupling the decision engine and the application program allows for scalable solutions serving thousands of users simultaneously using a wide variety of application programs.

Embodiments will now be discussed with reference to the accompanying figures, which depict one or more exemplary embodiments. Embodiments may be implemented in many different forms and should not be construed as limited to the embodiments set forth herein, shown in the figures, and/or described below. Rather, these exemplary embodiments are provided to convey the principles of the invention, as set forth in the claims, to those of skill in the art.

FIG. 1 is a functional block diagram showing the interaction of various elements for implementing one embodiment of a system and method for deploying predictive models.

In one embodiment, electronic data is received from multiple sources, the electronic data including, financial data and characteristic data about a consumer user associated with the financial data. An application program requiring a consumer user specific decision interacts with a decision engine employing an appropriate decision model for the particular desired consumer user decision providing consumer data and a model identifier to the decision engine which uses the provided information to select and employ an appropriate decision model relating to the consumer user specific decision.

Following processing the decision model with characteristic and other data associated with the consumer user, a decision is rendered by the decision engine and provided to the originating application program.

By decoupling the components responsible for orchestrating the data and services required to deliver a specific consumer experience and the components responsible for providing personalized and optimized experience decisions, less processor time is used in deploying updates to decision models and application programs, and a high degree of flexibility is achieved together with rapid and safe deployment, efficient and decoupled execution and timely measurement and analysis. Further, decoupling the decision engine and the application program allows for scalable solutions serving thousands of users simultaneously using a wide variety of application programs.

Referring to FIG. 1, in one embodiment, system 100 for system for deploying predictive models includes one or more of a first computing system, such as consumer user computing system 102, operatively coupled through one or more communication channels, such as communication channels 104, to one or more of a second computing system, such as data aggregation computing system 106, a third computing system, such as application program computing system 108, and a fourth computing system, such as decision engine computing system 110. The communication channel is, in one embodiment, bidirectional so that all computing systems discussed herein may exchange data and otherwise interoperate together.

As used herein, the term "computing system" includes, but is not limited to, a stationary computing system such as a desktop computing system, a network accessible computing resource, a virtual computing resource, a server computing system, a workstation, a desktop computing system, a mobile computing system, including, but not limited to, smart phones, portable devices, and/or devices worn or carried by a user, a database system or storage cluster, a switching system, a router, any hardware system, any communications system, any form of proxy system, a gateway system, a firewall system, a load balancing system, or any device, subsystem, or mechanism that includes components that can execute all, or part, of any one of the processes and/or operations as described herein.

In addition, as used herein, the term computing system can denote, but is not limited to, systems made up of multiple stationary computing systems, network accessible computing resources, server computing systems, workstations, desktop computing systems, mobile computing systems, database systems or storage clusters, switching systems, routers, hardware systems, communications systems, proxy systems, gateway systems, firewall systems, load balancing systems, or any devices that are configured to perform the processes and/or operations as described herein.

In one embodiment, two or more assets, such as computing systems and/or virtual assets, and/or two or more computing environments, are connected by one or more communications channels, such as communication channel 104, including but not limited to, Secure Sockets Layer communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network", or alternatively, "communication channel", includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

In one embodiment, one or more additional computing systems are coupled to communication channel 104, such as financial institution computing system 112, party computing system 114 and decision model designer computing system 116.

In one embodiment, computing systems 102, 106, 108, 110, 112, 114 and 116 each have one or more respective computing processors, such as computing processors 118, 120, 122 and 124. Other computing processors are not shown, to avoid overcomplicating the drawing figures.

In one embodiment, computing systems 102, 106, 108, 110, 112, 114 and 116 also have one or more respective memories, such as memories 126, 128, 130 and 132. Other memories are not shown, to avoid overcomplicating the drawing figures. The respective computing processors, such as computing processors 118, 120, 122 and 124, are respectively coupled to memories 126, 128, 130 and 132, and are configured to execute instructions stored in those respective memories, such as computing processor executable instructions to perform a process, such as one or more processes of application program 134, such as process for deploying predictive models discussed below with respect to FIGS. 2 and 3.

Herein, application programs include, in one embodiment, but are not limited to, financial application programs for performing different financial functions, such as financial management, financial transaction management, tax preparation, Point Of Sale (POS), etc.

Examples of currently available types of financial management programs include, but are not limited to, computing system implemented and/or on-line personal financial management systems, packages, programs, modules, or applications, computing system implemented and/or on-line personal financial transaction management systems, packages, programs, modules, or applications, computing system implemented and/or on-line personal tax preparation systems, packages, programs, modules, or applications, computing system implemented and/or on-line personal banking systems, packages, programs, modules, or applications, computing system implemented and/or on-line personal accounting systems, packages, programs, modules, or applications, computing system implemented and/or on-line business financial management systems, packages, programs, modules, or applications, computing system implemented and/or on-line business financial transaction management systems, packages, programs, modules, or applications, computing system implemented and/or on-line Point Of Sale (POS) systems, packages, programs, modules, or applications; computing system implemented and/or on-line business tax preparation systems, packages, programs, modules, or applications, computing system implemented and/or on-line business banking systems, packages, programs, modules, or applications, computing system implemented and/or on-line invoicing systems, packages, programs, modules, or applications; computing system implemented and/or on-line business accounting systems, packages, programs, modules, or applications, and computing system implemented and/or on-line inventory systems, packages, programs, modules, or applications.

Specific examples of currently available types of financial management systems include the financial management systems offered by Quicken™, Quicken Online™, Mint™, Mint Online™, TurboTax™, Quickbooks™ and Quickbooks Online™ available from Intuit, Inc., of Mountain View, Calif.

In one embodiment, memory 126 of consumer user computing system 102 includes one or more of login data 136, web browser 138, and at least a portion of application program 134. In one embodiment, consumer user computing system 102 is a computing system under the control of a consumer utilizing application program 134 which includes, in one embodiment, at least a portion of a process for deploying predictive models discussed herein. In one embodiment, the portion of application program 134 is deployed on consumer user computing system 102 as a result of a consumer user of consumer user computing system 102 being validated as an authorized user of application program computing system 108.

In one embodiment, memory 128 of data aggregation computing system 106 includes login data 142, financial data 144 and consumer user data 145.

In one embodiment, financial data 144 includes, but is not limited to, business or personal identification data, transactional data including payee identification and transaction details, payor identification data, date and time data, geolocation data associated with one or more transactions represented in the transaction data, and/or any other financial data deemed relevant by a designer of a particular implementation of application program 134 and process for deploying predictive models discussed herein.

In one embodiment, the second computing system, depicted herein as data aggregation computing system 106 is an exemplary data aggregation computing system, and aggregates data from other computing systems on a semi-random or periodic basis, such as hourly, daily, weekly, or on any other period known to those of ordinary skill having the benefit of this disclosure.

In one example, data aggregation computing system 106 aggregates data from one or more financial institution computing systems, such as financial institution computing system 112, for example, and is thus configured to receive, analyze, store, and provide financial data of one or more consumer user accounts at one or more financial institutions.

The financial institutions include, but are not limited to, any business entity such as a bank, a credit union, a mortgage company, a stock brokerage, retail establishment, or any other business entity performing financial activities on behalf of one or more consumer users of one or more consumer user accounts.

In one embodiment, a financial activity is any type of activity involving the processing or analysis of payments, sale, income, loans, or any other type of activity involving the transfer of money to or from one or more consumer user accounts.

In one embodiment, a consumer user account is a business arrangement, such as with a bank, to process and account for payments, receive and account for income, and perform other financial transactions, and/or to provide a record of those payments and other financial transactions, typically on the behalf of a consumer user who owns or otherwise controls the consumer user account. Examples of such consumer user accounts include, but are not limited to, checking and savings accounts, 401K accounts, merchant accounts, stock brokerage accounts, and credit card accounts.

In one embodiment, login data 142 includes consumer user specific login data, such as at least a portion of login data 136 of consumer user computing system 102, for example, and authenticates data aggregation computing system 106 as an authorized entity and thus allows data aggregation computing system 106 to be authenticated by and access data and/or services of financial institution computing system 112. Thus, in one example, once data aggregation computing system 106 is authenticated by financial institution computing system 112, data aggregation computing system 106 is enabled to access and download data on behalf of the consumer user who is associated with the login data used for the authentication.

In various embodiments, transfer of at least a portion of financial data 144 from one or more financial institutions, such as a financial institution operating or otherwise in control of financial institution computing system 112, may occur through a function configured to download at least a portion of financial data 144 to a computing system from which the matched login data was received, or through other means of providing access to financial data 144.

In another example, following consumer user login data of login data 136 being provided by data aggregation computing system 106 to financial institution computing system 112, data aggregation computing system 106 is recognized to be operating on behalf of a respective consumer user having a consumer user account managed by financial institution computing system 112. Following data aggregation computing system 106 being granted access to financial data stored within financial institution computing system 112, at least a portion of financial data 144 is provided to data aggregation computing system 106 through, for example, screen scraping of consumer user specific webpages provided by a webserver associated with financial institution computing system 112.

In one embodiment, consumer user data 145 includes consumer user data associated with or of one or more consumer users for which data is aggregated by data aggregation computing system 106, such as a consumer user associated with or otherwise controlling consumer user computing system 102.

Consumer user data 145, in one embodiment, includes one or more of shopping preferences, dining preferences, geographic location, merchants frequently visited by the consumer user, merchants disliked by the consumer user, ordering preferences, historical information regarding one or more actions the consumer user has taken when using one or more applications programs such as application program 134 or application programs other than application program 134, tax refund amounts, occupation, number of dependents, marital status, which tax forms are used when tax returns are prepared for the given consumer user, and or any other data that a particular decision model of decision engine 153 and model data 154 needs to make an informed and intelligent decision.

In one embodiment, memory 130 of application program computing system 108 includes one or more of at least a portion of application program 134 which includes at least a portion of process for deploying predictive models, website data 148, webserver 150, and login data 152. In one embodiment, memory 130 further includes one or more of at least a portion of decision engine 153 and at least a portion of model data 154.

In one embodiment, computing system 108 is a computing system under the control of an entity managing one or more application programs, such as application program 134 being managed or provided for use by one or more consumer users, such as a consumer user associated with or otherwise in control of consumer user computing system 102. As discussed above, application program 134 includes any type of application program requiring consumer user specific decision-making, such as a financial management application program discussed above.

In one embodiment, memory 132 of decision engine computing system 110 includes one or more of login data 156, decision engine 153, and model data 154. In one embodiment, decision engine computing system 110 is a computing system configured to use aggregate electronic data, such as at least a portion of financial data 144, and or at least a portion of consumer user data 145, and model data 154 to make consumer user specific decisions affecting either the functionality of application program 134 and/or the presentation or functionality of a user interface of application program 134, or for other reasons.

In practical application, and in one embodiment, a consumer user of consumer user computing system 102 is an authorized consumer user of a consumer user account associated with application program computing system 108, owned or otherwise controlled by a business entity such as a bank or third party. Authorization data associated with one or more authorized users is represented within login data 152.

Login data 152, in one embodiment, includes authorization data which, when matched by other data, such as login data 136 of consumer user computing system 102, authorizes a consumer user associated with or otherwise in control of consumer user computing system 102 to perform one or more tasks of application program 134 of application program computing system 108. Such authorized tasks may include viewing or interacting with a consumer user specific webpage generated by or otherwise presented by web server 150 through communication channel 104 to web browser 138 of consumer user computing system 102. In one embodiment, login data 136 is a network address of consumer user computing system 102, which when recognized by application program computing system 108 triggers application program computing system 108 to allow consumer user computing system 102 access to functionality and data associated with or authorized for a known consumer user in control of or otherwise operating consumer user computing system 102. In one embodiment, a network address includes one or more of a MAC address or an Internet Protocol (IP) address. One of ordinary skill having the benefit of this disclosure will readily appreciate that any computing system described herein may validate and/or otherwise authorize a given set of functionality and/or access to data based on a known network address associated with a known authorized consumer user.

In one embodiment, at various times while the consumer user of consumer user computing system 102 is interacting with application program 134, perhaps, for example, when the consumer user is interacting with a user interface to accomplish a goal, a consumer user specific decision may be needed by application program 134, in order to optimize performance of application program 134, to provide a customized experience for the consumer user, or to otherwise tailor or adapt functionality included within application program 134.

In one embodiment, in order to provide the customized experience, or to otherwise tailor or adapt functionality included within application program 134, a request may be made by application program 134 to decision engine 153 for decision engine 153 to utilize at least a portion of either or both of consumer user data 145 and financial data 144, and model data 154 to produce a decision result. In one embodiment, the decision result produced by decision engine 153 is then provided back to application program 134 where the decision result is employed to provide the desired customized experience.

In one embodiment, model data 154 includes one or more decision models that produce decisions tailored to particular consumer user data, such as at least a portion of consumer user data 145, and other data, such as financial data 144. In one embodiment, model data 154 defines a correlative/causal relationship between kinds of consumer data and kinds of consumer behaviors and preferences.

In one embodiment, a decision model is the result of analysis focused on solving an optimization problem, such as, but not limited to, providing a customized experience, or otherwise tailoring or adapting functionality included within application program 134. In one embodiment, creating a decision model includes an examination of what is known about consumer users, such as data included within consumer user data 145, what is known about business requirements, such as which portions of application 134 may be tailored or customized according to the data known about consumer users. Decision models are then executed against available data to produce an outcome that customizes functionality and/or presentation or development of a user interface within application program 134.

Decision models may be highly complex, and executed by a decision engine, such as decision engine 153, which supports a complex algorithm capable of interpreting the decision model. Alternatively, decision models may also be simple, and produced through application of common sense. Ultimately, a decision model is most easily thought of as a black box that, when paired with the appropriate decision engine, takes data about or of a consumer user as input and produces a decision as output. Thus, so long as the inputs and outputs remain relatively static, the particulars of what data is needed for a given decision, how the data is considered and weighted, and other factors regarding how the decision are made may be changed at any time without consequence to the performance of the application program.

In the preceding discussion, particular elements of data, such as login data 136, portions of application program 134, login data 142, financial data 144, consumer user data 145, model data 154, and other data discussed herein have been generally depicted as being presented on particular computing systems, such as consumer user computing system 102, data aggregation computing system 106, or application program computing system 108. However, one or more portions or the entirety of any of those data sets, or application program 134 may instead be stored in a network accessible database, such as database 158, and retrieved from database 158 when needed.

Further, decision engine computing system 110 has been described as a network accessible service, with application program 134 of application program computing system 108 accessing decision engine 153 through some form of network communication. In one embodiment, and in one example, decision engine 153 and model data 154 are deployed together as a standalone module executing by itself on application program computing system 108. In this example, application program 134 may request a decision of decision engine 153 by communicating directly with decision engine 153, thus avoiding any network delays that might result from communicating with decision engine computing system 110 over communication channel 104.

Figure 2:
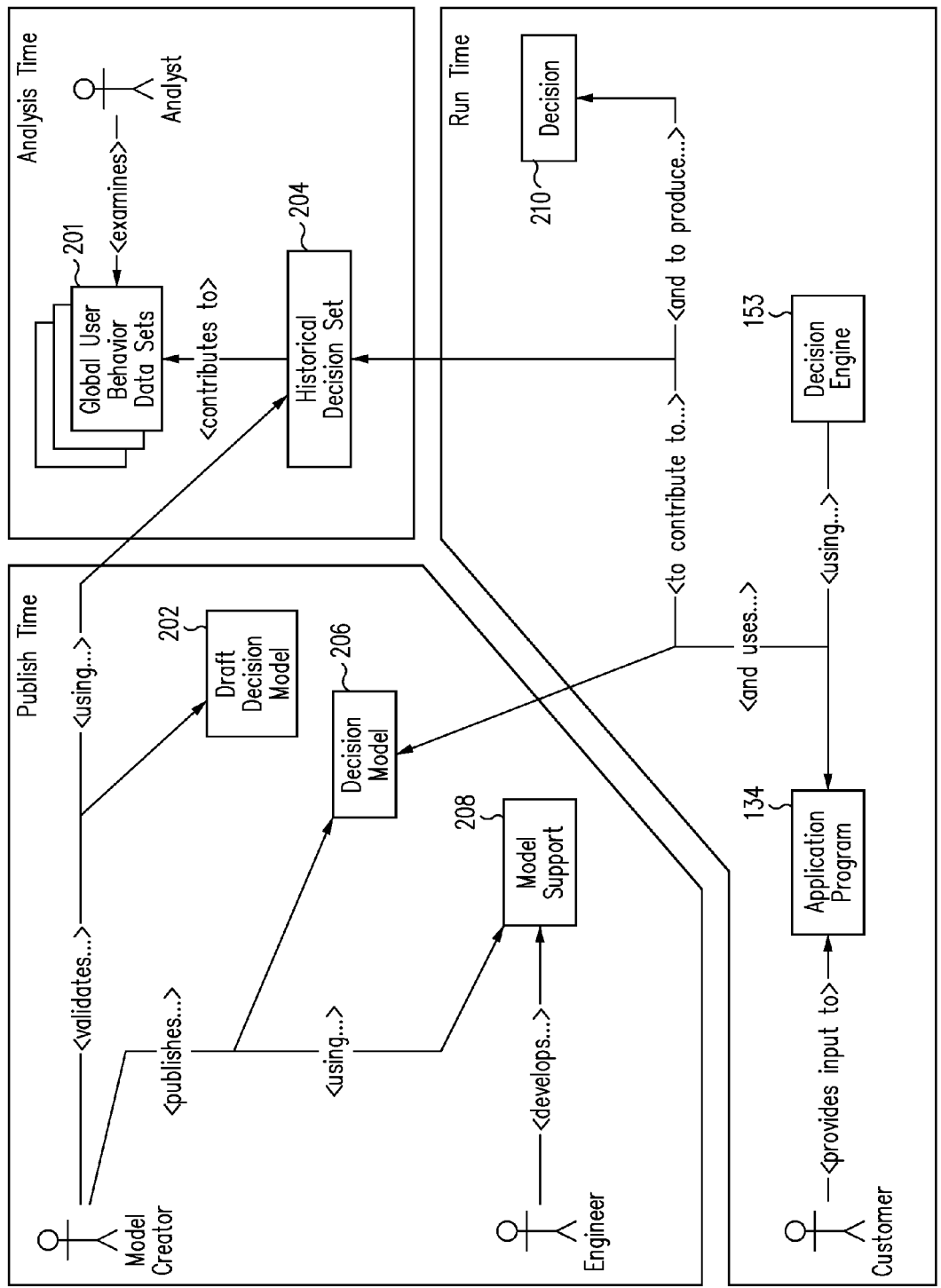
FIG. 2 is a pictorial diagram depicting at least part of a process for deploying predictive models in accordance with one embodiment.

FIG. 2 is a pictorial diagram depicting at least part of a process for deploying predictive models in accordance with one embodiment.

Referring to FIGS. 1 and 2 together, decision models are created in order to accurately predict consumer user decisions and preferences based on data known about the consumer user, and in one embodiment, how that consumer user compares with a larger population of users. Thus, consumer user characteristics determined to be important to a given decision are incorporated into a decision model used to make the decision. The particular values of those characteristics associated with a given consumer will cause a different customization of a decision, as compared with a customization of the same decision with respect to a different consumer user having different values of those same characteristics. Global user behavior data sets, such as global user behavior data set 201, are used to determine how one or more subsets of a larger population responds to situations associated with the particular decision being considered.

In one embodiment, a draft decision model 202 is created employing a unique decision model algorithm using particular consumer data specified by a model creator and producing customized output particularly tailored to the specified consumer user data. In one embodiment, draft decision model 202 is validated using historical decision set 204, and once validated as performing accurately, i.e. making correct decisions according to data presented within historical decision set 204, is published as decision model 206.

In one embodiment, publication takes place using one or more publishing tools depicted as model support 208 provided by an application or decision engine developer, such as might be found, for example on decision model designer computing system 116. In one embodiment, the publication process includes determining one or more architecture resources to employ, based on one or more characteristics of the particular decision model. In one embodiment, architecture resources include memory, network access, and processor load.

If a given decision model is determined to have a high memory footprint, model data associated with that particular given decision model includes data reflecting that the given decision model is best deployed in a computing environment having above-average memory resources available. If a given decision model is determined to be computing processor intensive, model data associated with that particular given decision model includes data reflecting that the given decision model is best deployed in a computing environment having additional processing power, such as additional computing processors.

In one embodiment, decision engine 153 is deployed on a computing system or computing resource having varying resource profiles (CPU, memory, network). In one embodiment, decision engine 153 is deployed on a computing system or computing resource configured to dynamically match a model with a deployment architecture.

Once published, decision model 206 is incorporated into model data 154. In one embodiment, each published decision model, such as decision model 206, includes one or more unique identifiers or other selection data which allows application program 134 to specifically identify a particular decision model representing a consumer user-specific decision the application program wants to have made by decision engine 153.

Execution of a given decision model, such as decision model 206, engages a process responsible for producing a decision, given consumer user data, as discussed herein. Because there are potentially many models available in model data 154 at any given time, application program 134 is responsible, in one embodiment, for selecting the correct model to run.

Decision engine 153 produces a decision 210 that, when matched with corresponding consumer user data 145 yields a portion of historical decision set 204. By coupling decision 210 made by decision engine 153 and corresponding consumer use data 145 into historical decision set 204, analysis of historical decision set 204 will determine how effective the particular decision model is at making the correct decision. Adjustments may be made to the decision model when needed to adjust weightings of one or more individual components of consumer user data 145 with respect to the particular decision model, update the particular decision model to include consideration of additional components of consumer user data 145 that were not previously used, or to update the particular decision model to remove consideration of one or more components of consumer user data 145, as needed. Any revisions made to the original decision model may be republished as a new decision model at any time without affecting the performance of application program 134.

In one embodiment, publication, analysis, and runtime modules are independent subsystems that provide the functionality described herein. Each of the three subsystems is decoupled from the others and communication between them occurs through a commonly defined protocol. The particularities of the commonly defined protocol may be determined by a designer of a particular implementation of the process operations discussed herein.

In one embodiment, decision engine 153 is configured as a network accessible service, accessible through an application program interface (API) or through any other means known to those of ordinary skill. In one embodiment, decision engine 153 receives at least a portion of consumer user data 145 and a model identifier when a request for a decision is received. In one embodiment, alternatively, decision engine 153 receives a pointer to at least a portion of consumer user data 145 instead of receiving the actual consumer user data.

Figure 3:
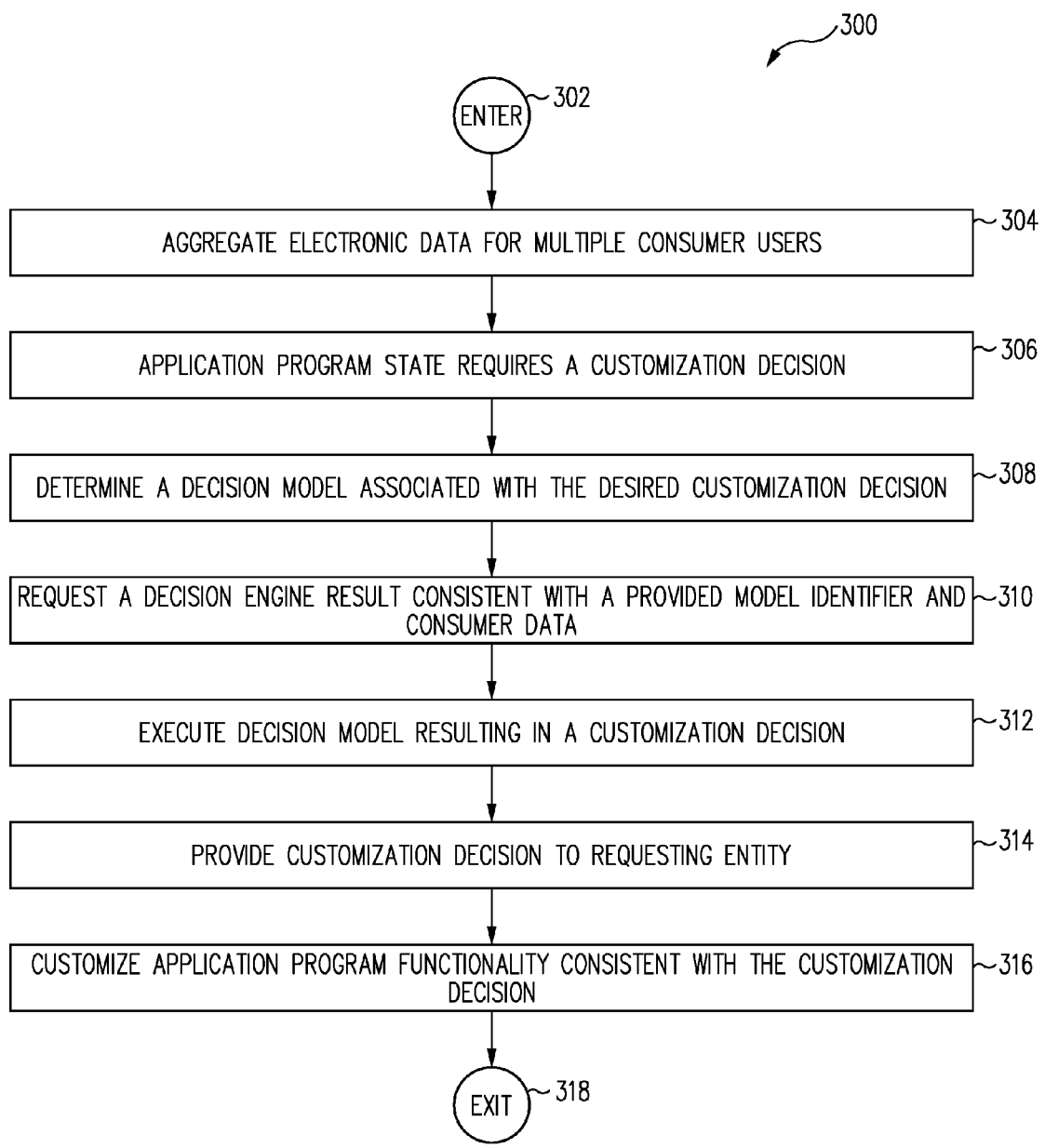
FIG. 3 is a flow diagram depicting a process for deploying predictive models in accordance with one embodiment.

FIG. 3 is a flow diagram depicting a process for deploying predictive models in accordance with one embodiment.

In the discussion that follows, process for deploying predictive models focuses on an example where a consumer user of application program 134 provides input to application program 134 through a consumer user interface of application program 134, where the next action to be performed by application program 134 is to generate and provide a user interface consistent with a customization decision made by decision engine 153. However, persons of ordinary skill will readily appreciate that this example is not limiting, and the process operations discussed herein will also be applicable to any preferred consumer user decision an application program requires to be made.

Referring to FIG. 1 and FIG. 3 together, process 300 for deploying predictive models begins at ENTER OPERATION 302 and proceeds with AGGREGATE ELECTRONIC DATA FOR MULTIPLE CONSUMER USERS OPERATION 304.

In one embodiment, at AGGREGATE ELECTRONIC DATA FOR MULTIPLE CONSUMER USERS OPERATION 304, electronic data is aggregated or otherwise collected from at least one source. In one embodiment, the electronic data is financial data. In one embodiment, the electronic data is financial data and is aggregated from more than one hundred financial institution computing systems.

In one embodiment, electronic data is aggregated or otherwise collected from at least one source on behalf of at least one consumer user.

In one embodiment, the electronic data is aggregated on a semi-random or periodic basis, such as hourly, daily, weekly, or on any other period known to those of ordinary skill having the benefit of this disclosure.

The financial institutions include, but are not limited to, any business entity such as a bank, a credit union, a mortgage company, a stock brokerage, retail establishment, or any other business entity performing financial activities on behalf of one or more consumer users of one or more consumer user accounts.

In one embodiment, a financial activity is any type of activity involving the processing or analysis of payments, sale, income, loans, or any other type of activity involving the transfer of money to or from one or more consumer user accounts.

In one embodiment, a consumer user account is a business arrangement, such as with a bank or other business or other entity, to process and account for payments, receive and account for income, and perform other financial transactions, and/or to provide a record of those payments and other financial transactions, typically on the behalf of a consumer user who owns or otherwise controls the consumer user account. Examples of such consumer user accounts include, but are not limited to, checking and savings accounts, 401K accounts, merchant accounts, stock brokerage accounts, and credit card accounts.

In one embodiment, authentication of an aggregating computing system is required by one or more financial institution computing systems prior to any consumer user specific data being made accessible for aggregation. In one embodiment, following a financial institution computing system or other computing system in the case of other types of data being aggregated, authenticating a data aggregation computing system as logging in on behalf of a consumer user who is an account holder at the particular financial institution, the financial institution computing system allows the data aggregation computing system 106 to access data and/or services of financial institution computing system 112.

In various embodiments, transfer of at least a portion of electronic data may occur through a function configured to download at least a portion of electronic data to a computing system from which the matched login data was received, or through other means of providing access to the electronic data.

In another example, following the data aggregation computing system being recognized to be operating on behalf of a respective consumer user having a consumer user account and the data aggregation computing system being granted access to electronic data stored within the entity computing system, at least a portion of the electronic data is provided to the data aggregation computing system through, for example, screen scraping of consumer user specific webpages provided by a webserver associated with the entity computing system.

In one embodiment, following completion of aggregation of electronic data from at least one data source on behalf of at least one consumer user, at AGGREGATE ELECTRONIC DATA FOR MULTIPLE CONSUMER USERS OPERATION 304, process flow proceeds with APPLICATION PROGRAM STATE REQUIRES A CUSTOMIZATION DECISION OPERATION 306.

In one embodiment, at APPLICATION PROGRAM STATE REQUIRES A CUSTOMIZATION DECISION OPERATION 306, a state of an application program employing decision engine 153 requires that a customization decision be performed by decision engine 153. In one embodiment, the application program state is a current state of the application program, and the application program requires the customization decision prior to moving forward with other process operations. In one embodiment, the application program state is a future state of the application program which has not yet become current. In one embodiment, the application program state is a future state of the application program which has not yet become current, where the application program requires the customization decision prior to advancing beyond the future state requiring the decision.

In one embodiment, if a current or future application state is expected to be achieved where the application program requires a customization decision, at APPLICATION PROGRAM STATE REQUIRES A CUSTOMIZATION DECISION OPERATION 306, process flow proceeds with DETERMINE A DECISION MODEL ASSOCIATED WITH THE DESIRED CUSTOMIZATION DECISION OPERATION 308.

In one embodiment, at DETERMINE A DECISION MODEL ASSOCIATED WITH THE DESIRED CUSTOMIZATION DECISION OPERATION 308, a determination is made of a particular decision model which is associated with the desired customization decision of the particular state of the application program noted at APPLICATION PROGRAM STATE REQUIRES A CUSTOMIZATION DECISION OPERATION 306.

Recall that a particular customization decision will be associated with a particular decision model. Thus if a given decision engine, such as decision engine 153, is configured to operate with five different decision models, for example, then the given decision engine is also configured to provide results including five different decisions. However, those five different decisions made be performed one time, ten times, hundreds of times, or however many times the particular application program arises at an application program state requiring the particular customization decision.

Because a given particular decision may be performed more often than a different particular decision, it may not always be the case that all decisions are performed an equal number of times. More likely, and in one embodiment, a first decision utilized more frequently in the application program is performed significantly more often than a second decision utilized less frequently in the application program.

In one embodiment, following the determination of a decision model associated with the desired customization decision, model data associated with the particular determined decision model is analyzed to determine any particular data needs required by the determined decision model.

For example, in an environment where a particular consumer user has six characteristics, with the six characteristics being referred to as characteristics A, B, C, D, E, and F, a first decision model requires, in one embodiment, that characteristics A, B, and C, of the particular consumer user be provided by the application program when a request is made for a decision, in order for the decision engine to be able to make a decision. Thus, when the application program requires that the first decision be made, data reflecting characteristics A, B, and C is provided to the decision engine contemporaneously in time with the request for the decision provided by the application program.

In the same example, a second decision model requires, in one embodiment, that characteristics A, C, and F of the particular consumer user be provided by the application program when a request is made for a decision, in order for the decision engine to be able to make a decision. Thus, when the application program requires that the second decision be made, data reflecting characteristics A, C, and F is provided to the decision engine contemporaneously in time with the request for the decision provided by the application program.

In one embodiment, decision models that require particular data regarding characteristics of the consumer user are not directly provided the required data with the request by the application program, but are instead provided a link to the data, such as a link into a database containing the data. In one embodiment, two or more links are provided by the application program, with each link pointing to one or more characteristics of the particular consumer user.

In one embodiment, following a decision model being determined which is associated with the customization decision, at DETERMINE A DECISION MODEL ASSOCIATED WITH THE DESIRED CUSTOMIZATION DECISION OPERATION 308, process flow proceeds with REQUEST A DECISION ENGINE RESULT CONSISTENT WITH A PROVIDED MODEL IDENTIFIER AND CONSUMER DATA OPERATION 310.

In one embodiment, at REQUEST A DECISION ENGINE RESULT CONSISTENT WITH A PROVIDED MODEL IDENTIFIER AND CONSUMER DATA OPERATION 310, an application program needing a decision and knowing which decision model is associated with the needed decision provides a request to the decision engine, and the request includes one or more of data of the consumer user associated with the needed decision, a model identifier associated with the decision model of the needed decision, and a consumer user identifier associated with the consumer user.

In one embodiment, at REQUEST A DECISION ENGINE RESULT CONSISTENT WITH A PROVIDED MODEL IDENTIFIER AND CONSUMER DATA OPERATION 310, an application program needing a decision and knowing which decision model is associated with the needed decision provides a request to the decision engine, and the request includes only a model identifier associated with the decision model of the needed decision, and a consumer user identifier associated with the consumer user. In one embodiment, when the decision engine receives such a request, it uses the provided consumer user identifier to access a database and retrieve any consumer user data required by the decision model associated with the provided model identifier.

In one embodiment, following completion of REQUEST A DECISION ENGINE RESULT CONSISTENT WITH A PROVIDED MODEL IDENTIFIER AND CONSUMER DATA OPERATION 310, process flow proceeds with EXECUTE DECISION MODEL RESULTING IN A CUSTOMIZATION DECISION OPERATION 312.

In one embodiment, at EXECUTE DECISION MODEL RESULTING IN A CUSTOMIZATION DECISION OPERATION 312, a decision model associated with the provided model identifier is executed together with consumer user data either provided by an originating computing system with the request issued at REQUEST A DECISION ENGINE RESULT CONSISTENT WITH A PROVIDED MODEL IDENTIFIER AND CONSUMER DATA OPERATION 310, or alternatively retrieved from one or more databases using a consumer user identifier provided with the request. In one embodiment execution of a decision model associated with the provided model identifier results in a decision.

In one example where the needed decision involves interview functionality of an application program where the application program asks questions of the consumer user in order for the application program to perform one or more functions for the consumer user, a needed decision involves whether to ask one or more particular questions of the consumer user, and if so, what order to ask the one or more particular questions of the consumer user.

In one embodiment, the decision engine applies consumer user data associated with the particular consumer user having the provided consumer user identifier to the decision model associated with the provided model identifier, resulting in a decision.

In one embodiment, following execution of the decision model by the decision engine at EXECUTE DECISION MODEL RESULTING IN A CUSTOMIZATION DECISION OPERATION 312, process flow proceeds with PROVIDE CUSTOMIZATION DECISION TO REQUESTING ENTITY OPERATION 314.

In one embodiment, at PROVIDE CUSTOMIZATION DECISION TO REQUESTING ENTITY OPERATION 314, results from the execution of the decision model by the decision engine at EXECUTE DECISION MODEL RESULTING IN A CUSTOMIZATION DECISION OPERATION 312 are provided back to the requesting entity, such as a requesting computing system running an application program needing the decision. In one embodiment, results from the execution of the decision model are provided in a known predetermined format.

In one embodiment, following receipt of the results of the execution of the decision model by the decision engine by the requesting entity, such as a requesting computing system, at PROVIDE CUSTOMIZATION DECISION TO REQUESTING ENTITY OPERATION 314, process flow proceeds with CUSTOMIZE APPLICATION PROGRAM FUNCTIONALITY CONSISTENT WITH THE CUSTOMIZATION DECISION OPERATION 316.

In one embodiment, at CUSTOMIZE APPLICATION PROGRAM FUNCTIONALITY CONSISTENT WITH THE CUSTOMIZATION DECISION OPERATION 316, the application program, such as application program 134 applies the customization decision provided by the decision engine to configure one or more configurable options within the application program. In one embodiment, the one or more configurable options involve presentation of data to the consumer user, such as the ordering of data within a presentation, the determination of one or more locations to put important data on the screen and/or which data to be presented is considered important, or the content of data within a presentation.

In one embodiment, following the implementation of the customization decision within the application program, at CUSTOMIZE APPLICATION PROGRAM FUNCTIONALITY CONSISTENT WITH THE CUSTOMIZATION DECISION OPERATION 316, the application program provides a visual presentation to the user, such as in a user interface, where the visual presentation to the user incorporates at least a portion of the customization decision.

In one embodiment, the customization for a given decision involves the presentation or ordering of financial data, such as financial data 144. In one embodiment, the customization includes displaying certain fields and data values of financial data 144 and not others, for a given consumer user.

In one embodiment, following customization of the application program functionality, process flow proceeds with EXIT OPERATION 318 at which time process 300 for deploying predictive models terminates awaiting new data.

In one embodiment, computing processor executable instructions to perform the process operations described herein may be stored on a non-transitory computer readable medium, such as a disk drive, a USB drive, a DVD, a CD, any memory stick, or any memory. In one embodiment, the computing processor executable instructions are read by a reader appropriate to the particular non-transitory computer readable medium, and are subsequently executed by a computing processor.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below. Further, any particular process operation discussed herein may be combined with any other particular process operation or operations discussed herein, in any order.

As discussed in more detail above, using the above embodiments, with little or no modification and/or input, there is considerable flexibility, adaptability, and opportunity for customization to meet the specific needs of various parties under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "aggregating", "alerting", "applying", "analyzing", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "informing", "monitoring", "obtaining", "posting", "processing", "providing", "receiving", "requesting", "saving", "sending", "storing", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language, and it is appreciated that a variety of programming languages may be used to implement the teachings of the present invention as described herein, and any references to a specific language or languages are provided for illustrative purposes only.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the figures, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A system for deploying predictive models comprising:
   an application computing system executing an application program, the application computing system being coupled to a network;
   a decision engine operatively coupled to the application program;
   a data aggregation service operatively coupled to the decision engine;
   receiving, at the application computing system, data identifying an authorized consumer user who is currently using the application program;
   determining, by the application program and using data associated with the authorized consumer user, a next action to be performed by the application program, the next action being a configurable action and involving at least one interaction with the authorized consumer user, wherein a possible next action is selected from a plurality of possible next actions of the application program, the determination of a next action requiring selection, by the application program from a plurality of decision models, of a first decision model specific to the next action to be performed, wherein decision models of the plurality of decision models require different sets of consumer user data to be analyzed in making a determination of the next action to be performed;
   determining, by the decision engine using resources of the data aggregation service and from a plurality of next action configurations, an active configuration appropriate for the authorized consumer user, the determination of the active configuration being dependent on results of an analysis of a particular consumer user data set specific a determined decision model, wherein the particular consumer user data set specific to the determined decision model is different than other user data sets associated with other decision models available for selection and is also a subset of an entirety of available data associated with the consumer user; and implementing, by the application program, the active configuration.

2. The system for deploying predictive models of claim 1 wherein the application program is selected from the group of application programs consisting of:
a financial application program;
a tax preparation application program;
a bookkeeping application program;
a payment application program;
a billing application program;
an application program for generating profit and loss reports;
an application program for generating invoices;
an application program for generating payroll;
an application program for providing bank statements or on-line banking feeds;
an application program for generating any financial reports;
an accounting application program;
a point of sale application program; and
an application program for tracking and processing inventory.

3. The system for deploying predictive models of claim 1 further comprising:
receiving, at the application program computing system, login information from a consumer user;
validating, by the application program computing system, the login information as being of an authorized consumer user;
correlating, by the application program computing system, the validated login information with a consumer user identifier; and
further wherein determining, by the application program, a next action to be performed by the application program, the next action being an action being configurable and involving at least one interaction with the authorized consumer user comprises:
determining, by the application program and using the consumer user identifier, a next action to be performed by the application program, the next action being an action being configurable and involving at least one interaction with the authorized consumer user.

4. The system for deploying predictive models of claim 1 wherein determining, by the decision engine using resources of the data aggregation service and from a plurality of next action configurations, an active configuration appropriate for the authorized consumer user comprises:
determining, by the decision engine, one or more data elements required by a decision model associated with the next action;
determining, by the decision engine, data values associated with the one or more data elements, the determined data values being data values associated with the authorized consumer user;
submitting, by the decision engine, the determined data values to a decision module configured to determine an active configuration associated with the next action;
determining, by the decision engine, using one or more of the submitted data values, an active configuration to be associated with the next action; and
associating the active configuration with the next action.

5. The system for deploying predictive models of claim 3 wherein determining, by the decision engine using resources of the data aggregation service and from a plurality of next action configurations, an active configuration appropriate for the authorized consumer user comprises:
determining, by the decision engine, one or more data elements required by a decision model associated with the next action;
determining, by the decision engine, data values associated with the one or more data elements, the determined data values being data values associated with the authorized consumer user;
submitting, by the decision engine, the determined data values to a decision module configured to determine a configuration associated with the next action; and
determining, by the decision engine, using one or more of the submitted data values, a configuration associated with the next action.

6. The system for deploying predictive models of claim 5 wherein determining data values associated with the one or more data elements comprises:
accessing, using the consumer user identifier, a data aggregation service of consumer data, the data aggregation service of consumer data including data values of at least two different consumer users; and
retrieving from the data aggregation service, one or more data values of the authorized consumer user, each of the retrieved data values corresponding with a respective one of the one or more data elements.

7. The system for deploying predictive models of claim 5 wherein determining, using one or more of the submitted data values, a configuration associated with the next action comprises:
accessing the data aggregation service to determine a population group that has population data values that match the determined data values associated with the authorized consumer user;
analyzing, by the data aggregation service, the determined data values to determine a population group having population data values matching the determined data values;
determining, by the decision engine, a configuration associated with the population group that has been personalized to the determined population group; and
implementing, by the application program computing system, the determined configuration.

8. The system for deploying predictive models of claim 7 wherein the determined configuration includes one or more configuration parameters selected from the group of configuration parameters consisting of:
a display parameter;
a data ordering parameter;
a priority parameter indicating that a particular aspect of the next action is important to the determined population group;
an inclusion parameter indicating that a particular optional aspect of the next action is important to the determined population group; and
an exclusion parameter indicating that it is important that a particular optional aspect of the next action is to be given little or no weight in the performance of the next action.

9. The system for deploying predictive models of claim 1 wherein the received data identifying an authorized consumer user who is currently using an application program is at least one selected from the group of data consisting of:
a network address associated with a computing system under the control of the consumer user;
a username used in a login sequence associated with the application program; and a username used in a login sequence of a computing system under the control of the consumer user.

10. The system for deploying predictive models of claim 1 wherein the decision engine employs one or more replaceable decision models.

11. The system for deploying predictive models of claim 1 wherein the application program is configured to specify to a decision engine which decision model is appropriate for a given next action, and wherein the decision model uses the designation of a particular model to determine particular consumer user data requirements as inputs to the particular model.

12. A computing system implemented method for deploying predictive models comprising the following, which is stored within one or more memories, which when executed individually or collectively by any set of one or more computing processors coupled to the one or more memories perform a process including:
  receiving data identifying an authorized consumer user who is currently using an application program;
  determining, using data associated with the authorized consumer user, a next action to be performed by the application program, the next action being a configurable action and involving at least one interaction with the authorized consumer user, wherein a possible next action is selected from a plurality of possible next actions of the application program, the determination of a next action requiring selection, by the application program from a plurality of decision models, of a first decision model specific to the next action to be performed, wherein decision models of the plurality of decision models require different sets of consumer user data to be analyzed in making a determination of the next action to be performed;
  determining, from a plurality of next action configurations, an active configuration appropriate for the authorized consumer user, the determination of the active configuration being dependent on results of an analysis of a particular consumer user data set specific to a determined decision model, wherein the particular consumer user data set specific to the determined decision model is different than other user data sets associated with other decision models available for selection and is also a subset of an entirety of available data associated with the consumer user; and
  implementing, by the application program, the active configuration.

13. The computing system implemented method for deploying predictive models of claim 12 wherein the application program is selected from the group of application programs consisting of:
  a financial application program;
  a tax preparation application program;
  a bookkeeping application program;
  a payment application program;
  a billing application program;
  an application program for generating profit and loss reports;
  an application program for generating invoices;
  an application program for generating payroll;
  an application program for providing bank statements or on-line banking feeds;
  an application program for generating any financial reports;
  an accounting application program;
  a point of sale application program; and
  an application program for tracking and processing inventory.

14. The computing system implemented method for deploying predictive models of claim 12 further comprising:
  receiving login information from a consumer user;
  validating the login information as being of an authorized consumer user;
  correlating the validated login information with a consumer user identifier; and
  further wherein determining a next action to be performed by the application program, the next action being an action being configurable and involving at least one interaction with the authorized consumer user comprises:
  determining, using the consumer user identifier, a next action to be performed by the application program, the next action being an action being configurable and involving at least one interaction with the authorized consumer user.

15. The computing system implemented method for deploying predictive models of claim 12 wherein determining, by a decision engine using resources of a data aggregation service and from a plurality of next action configurations, an active configuration appropriate for the authorized consumer user comprises:
  determining, by the decision engine, one or more data elements required by a decision model associated with the next action;
  determining, by the decision engine, data values associated with the one or more data elements, the determined data values being data values associated with the authorized consumer user;
  submitting, by the decision engine, the determined data values to a decision module configured to determine an active configuration associated with the next action;
  determining, by the decision engine, using one or more of the submitted data values, an active configuration to be associated with the next action; and
  associating the active configuration with the next action.

16. The computing system implemented method for deploying predictive models of claim 14 wherein determining, using the consumer user identifier, a next action to be performed by the application program, the next action being an action being configurable and involving at least one interaction with the authorized consumer user comprises:
  determining one or more data elements required by a decision model associated with the next action;
  determining data values associated with the one or more data elements, the determined data values being data values associated with the authorized consumer user;
  submitting the determined data values to a decision module configured to determine a configuration associated with the next action; and
  determining using one or more of the submitted data values, a configuration associated with the next action.

17. The computing system implemented method for deploying predictive models of claim 16 wherein determining data values associated with the one or more data elements comprises:
  accessing, using the consumer user identifier, a data aggregation service of consumer data, the data aggregation service of consumer data including data values of at least two different consumer users; and
  retrieving one or more data values of the authorized consumer user, each of the retrieved data values corresponding with a respective one of the one or more data elements.

18. The computing system implemented method for deploying predictive models of claim 16 wherein determining, using one or more of the submitted data values, a configuration associated with the next action comprises:
accessing a data aggregation service to determine a population group that has population data values that match the determined data values associated with the authorized consumer user;
analyzing the determined data values to determine a population group having population data values matching the determined data values;
determining a configuration associated with the population group that has been personalized to the determined population group; and
implementing the determined configuration.

19. The computing system implemented method for deploying predictive models of claim 18 wherein the determined configuration includes one or more configuration parameters selected from the group of configuration parameters consisting of:
a display parameter;
a data ordering parameter;
a priority parameter indicating that a particular aspect of the next action is important to the determined population group;
an inclusion parameter indicating that a particular optional aspect of the next action is important to the determined population group; and
an exclusion parameter indicating that it is important that a particular optional aspect of the next action is to be given little or no weight in the performance of the next action.

20. The computing system implemented method for deploying predictive models of claim 12 wherein the received data identifying an authorized consumer user who is currently using an application program is at least one selected from the group of data consisting of:
a network address associated with a computing system under the control of the consumer user;
a username used in a login sequence associated with the application program; and
a username used in a login sequence of a computing system under the control of the consumer user.

21. The computing system implemented method for deploying predictive models of claim 15 wherein the decision engine employs one or more replaceable decision models.

22. The computing system implemented method for deploying predictive models of claim 12 wherein the application program is configured to specify to a decision engine which decision model is appropriate for a given next action, and wherein the decision model uses the designation of a particular model to determine particular consumer user data requirements as inputs to the particular model.

23. A nontransitory computer-readable medium having a plurality of computing processor-executable instructions stored thereon which, when executed by at least one computing processor, performs a process comprising:
receiving data identifying an authorized consumer user who is currently using an application program;
determining, using data associated with the authorized consumer user, a next action to be performed by the application program, the next action being a configurable action and involving at least one interaction with the authorized consumer user, wherein a possible next action is selected from a plurality of possible next actions of the application program, the determination of a next action requiring selection, by the application program from a plurality of decision models, of a first decision model specific to the next action to be performed, wherein decision models of the plurality of decision models require different sets of consumer user data to be analyzed in making a determination of the next action to be performed;
determining, from a plurality of next action configurations, an active configuration appropriate for the authorized consumer user, the determination of the active configuration being dependent on results of an analysis of a particular consumer user data set specific to a determined decision model, wherein the particular consumer user data set specific to the determined decision model is different than other user data sets associated with other decision models available for selection and is also a subset of an entirety of available data associated with the consumer user; and
implementing, by the application program, the active configuration.

24. The nontransitory computer-readable medium of claim 23 wherein the application program is selected from the group of application programs consisting of:
a financial application program;
a tax preparation application program;
a bookkeeping application program;
a payment application program;
a billing application program;
an application program for generating profit and loss reports;
an application program for generating invoices;
an application program for generating payroll;
an application program for providing bank statements or on-line banking feeds;
an application program for generating any financial reports;
an accounting application program;
a point of sale application program; and
an application program for tracking and processing inventory.

25. The nontransitory computer-readable medium of claim 23 further comprising:
receiving login information from a consumer user;
validating the login information as being of an authorized consumer user;
correlating the validated login information with a consumer user identifier; and
further wherein determining a next action to be performed by the application program, the next action being an action being configurable and involving at least one interaction with the authorized consumer user comprises:
determining, using the consumer user identifier, a next action to be performed by the application program, the next action being an action being configurable and involving at least one interaction with the authorized consumer user.

26. The nontransitory computer-readable medium of claim 23 wherein determining, by a decision engine using resources of a data aggregation service and from a plurality of next action configurations, an active configuration appropriate for the authorized consumer user comprises:
determining, by the decision engine, one or more data elements required by a decision model associated with the next action;

determining, by the decision engine, data values associated with the one or more data elements, the determined data values being data values associated with the authorized consumer user;

submitting, by the decision engine, the determined data values to a decision module configured to determine an active configuration associated with the next action;

determining, by the decision engine, using one or more of the submitted data values, an active configuration to be associated with the next action; and associating the active configuration with the next action.

27. The nontransitory computer-readable medium of claim 25 wherein determining, using the consumer user identifier, a next action to be performed by the application program, the next action being an action being configurable and involving at least one interaction with the authorized consumer user comprises:

determining one or more data elements required by a decision model associated with the next action;

determining data values associated with the one or more data elements, the determined data values being data values associated with the authorized consumer user;

submitting the determined data values to a decision module configured to determine a configuration associated with the next action; and determining, using one or more of the submitted data values, a configuration associated with the next action.

28. The nontransitory computer-readable medium of claim 27 wherein determining data values associated with the one or more data elements comprises:

accessing, using the consumer user identifier, a data aggregation service of consumer data, the data aggregation service of consumer data including data values of at least two different consumer users; and retrieving one or more data values of the authorized consumer user, each of the retrieved data values corresponding with a respective one of the one or more data elements.

29. The nontransitory computer-readable medium of claim 27 wherein determining, using one or more of the submitted data values, a configuration associated with the next action comprises:

accessing a data aggregation service to determine a population group that has population data values that match the determined data values associated with the authorized consumer user;

analyzing the determined data values to determine a population group having population data values matching the determined data values;

determining a configuration associated with the population group that has been personalized to the determined population group; and implementing the determined configuration.

30. The nontransitory computer-readable medium of claim 29 wherein the determined configuration includes one or more configuration parameters selected from the group of configuration parameters consisting of:

a display parameter;

a data ordering parameter;

a priority parameter indicating that a particular aspect of the next action is important to the determined population group;

an inclusion parameter indicating that a particular optional aspect of the next action is important to the determined population group; and an exclusion parameter indicating that it is important that a particular optional aspect of the next action is to be given little or no weight in the performance of the next action.

31. The nontransitory computer-readable medium of claim 23 wherein the received data identifying an authorized consumer user who is currently using an application program is at least one selected from the group of data consisting of:

a network address associated with a computing system under the control of the consumer user;

a username used in a login sequence associated with the application program; and a username used in a login sequence of a computing system under the control of the consumer user.

32. The nontransitory computer-readable medium of claim 26 wherein the decision engine employs one or more replaceable decision models.

33. The nontransitory computer-readable medium of claim 23 wherein the application program is configured to specify to a decision engine which decision model is appropriate for a given next action, and wherein the decision model uses the designation of a particular model to determine particular consumer user data requirements as inputs to the particular model.

* * * * *